(12) United States Patent  (10) Patent No.: US 7,452,027 B2
Hensler et al.  (45) Date of Patent: Nov. 18, 2008

(54) TEMPORARY CONTAINER FOR FIFTH WHEEL TRACTOR

(76) Inventors: Kirk Hensler, 665 Woodcreek Dr., Waterford, MI (US) 48327; Patrick J. Bourcier, 301 Arnold Ave., Pontiac, MI (US) 48341

( * ) Notice: Subject to any disclaimer, the term of this patent is extended or adjusted under 35 U.S.C. 154(b) by 302 days.

(21) Appl. No.: 11/221,556

(22) Filed: Sep. 8, 2005

(65) Prior Publication Data

US 2006/0062647 A1 Mar. 23, 2006

Related U.S. Application Data

(60) Provisional application No. 60/607,923, filed on Sep. 8, 2004.

(51) Int. Cl.
*B62D 33/02* (2006.01)

(52) U.S. Cl. .................................................. 296/183.1

(58) Field of Classification Search .............. 296/183.1, 296/10, 24.3, 24.33, 181.7, 182.1, 186.1, 296/186.5, 193.01, 193.04
See application file for complete search history.

(56) References Cited

U.S. PATENT DOCUMENTS 6,644,708 B1 * 11/2003 Grzegorzewski et al. ...... 296/32

* cited by examiner

*Primary Examiner*—Hilary Gutman
(74) *Attorney, Agent, or Firm*—The Weintraub Group, P.L.C.

(57) ABSTRACT

A cargo carrier for temporary attachment atop the bed of a fifth wheel tractor and temporarily replace the trailer includes a mounting frame, means for removably anchoring the mounting frame to the tractor such that the rails encircle the fifth wheel, and an upwardly open container for carrying articles removably secured to the mounting frame. The mounting frame includes a pair of longitudinally extending side rails, and a pair of transversely extending forward and rearward cross-rails. The container includes a bottom, a pair of sidewalls, and a pair of end walls, the walls being generally perpendicular to and removably connected to the bottom and to one another to form an upwardly open rectangular shaped structure.

20 Claims, 9 Drawing Sheets

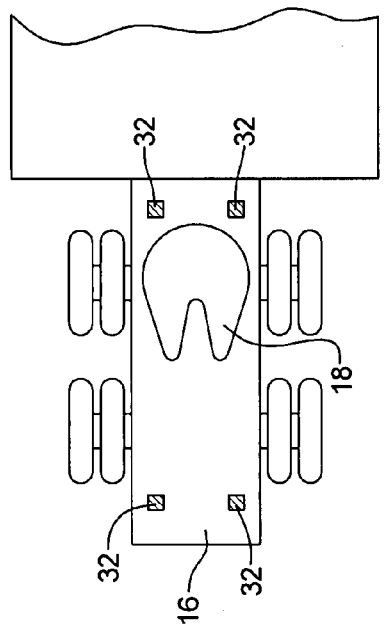
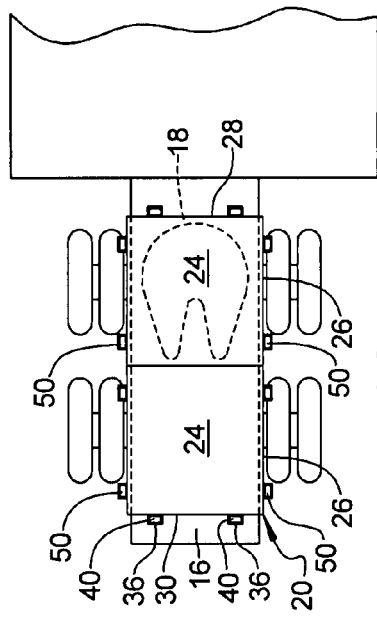
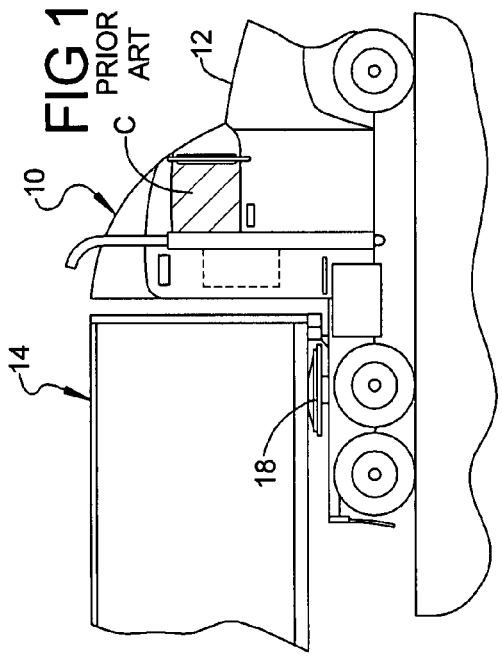
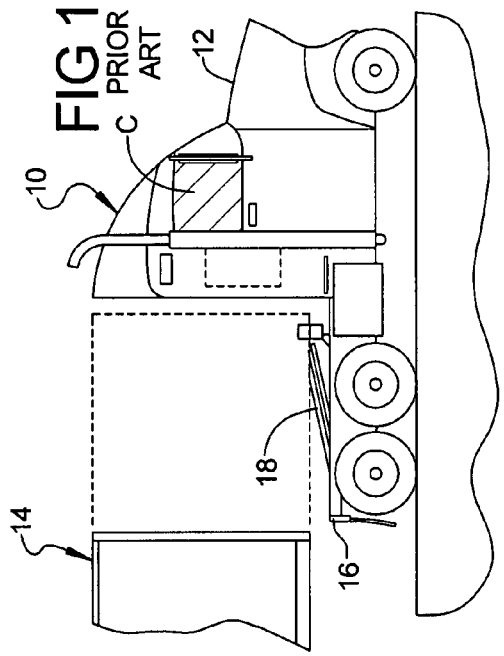

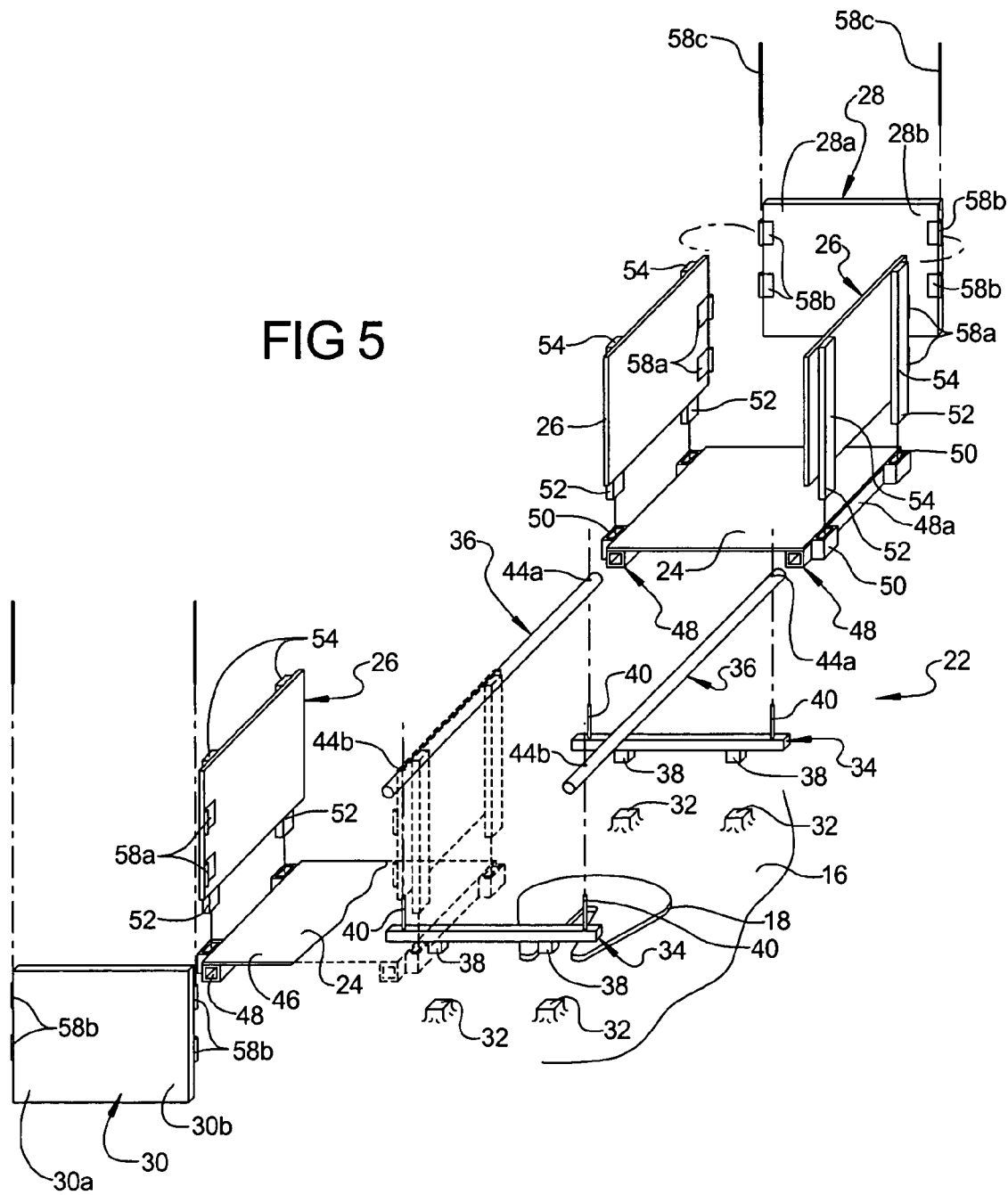

TEMPORARY CONTAINER FOR FIFTH WHEEL TRACTOR

CROSS-REFERENCE TO RELATED APPLICATIONS

This application claims the benefit of U.S. Provisional Patent Application Ser. No. 60/607,923, filed Sep. 8, 2004, the disclosure of which incorporated herein in its entirety.

BACKGROUND OF THE INVENTION

1. Field of the Invention

The present invention relates to a vehicle cargo carrier attachment and, more particularly, to a temporary portable container attachment adapted to connect to a standard tractor or truck having a fifth wheel receiver-type trailer hitch.

2. Description of Related Art

Numerous large articulated transport trucks are known, such as that shown in U.S. Pat. No. 6,443,476. Articulated trucks are composed of two or more units and typically comprise a tractor and at least one semi-trailer. The tractor acts as the power unit as the engine is situated therein and includes the transmission, brake-control system, fuel tank, and cap in which the driver sits. The semi-trailer has wheels only under the rearward end and is hitched at the forward end onto a horizontal platform or bed extending over the rear wheels of the tractor.

The tractor portion of the transport truck includes a disk, oftentimes referred to as a fifth wheel, located atop the horizontal bed of the tractor. A pin located under the front of the semi-trailer locks into the disk for attaching the semi-trailer to the tractor while the platform provides support for the front end of the trailer. The semi-trailer is quickly detached from the tractor by disconnecting the connection with the pin. This allows the tractor to connect with and haul a second semi-trailer while the first semi-trailer is being unloaded.

The standard tractor-trailer assembly is quite large, rendering movement of the tractor-trailer assembly down a narrow roadway all but impossible.

A need exists for a cargo carrier attachment and cargo carrying container for use with a tractor or vehicle having a trailer hitching fifth wheel, which can be quickly and easily attached to and detached from the tractor or vehicle, and attached and detached without the need for special tools.

A need exists for a cargo-carrying container that mounts directly onto the bed of a fifth wheel tractor and temporarily replaces the trailer. Such container would be desirable as enabling a tractor to maneuver and transport cargo down a narrow roadway or the like that would be inaccessible to the articulated truck.

A need exists for a cargo container that is portable, easily erected/torn down, and provides covering structure for protecting and covering cargo.

SUMMARY OF THE INVENTION

An object of the invention is to improve upon auxiliary cargo accessories for motor vehicles, such as tractor and truck vehicles having a fifth wheel receiver-type trailer hitch.

Another object of this invention is the provision of means on the tractor bed that enables a cargo-carrying container to be assembled atop the tractor bed and above the fifth wheel, when the fifth wheel is not otherwise used for hitching to a trailer.

Another object is the provision of a cargo-carrying container that does not require attachment to the bumper or to the frame on the underside of the tractor or vehicle, yet can carry substantial loads safely.

A further object is to enable a single configuration of cargo carrier useful with a variety of vehicle body and platform designs.

The present invention includes a method and a cargo carrier apparatus for carrying cargo on the exterior of a tractor and/or vehicle having a trailer hitch receiver.

The above noted objects of the invention are accomplished by a cargo carrier for temporary attachment to the frame of and atop the fifth wheel of a tractor, comprising an elongated generally rectangular shaped mounting frame, said mounting frame including a pair of longitudinally extending side rails, a forward cross-rail, and a rearward cross-rail, the cross-rails extending transversely of the side rails, means for removably anchoring the mounting frame to said tractor such that the rails encircle the fifth wheel, an upwardly open container for carrying articles removably secured to said mounting frame and supported thereby, said container including a bottom portion, a pair of opposed generally parallel sidewalls, a forward end wall, and a rearward end wall opposed to and generally parallel to said forward end wall, said bottom portion and walls being generally planar and rectangular in shape, first means for removably connecting the sidewalls to the bottom portion in a manner that the side walls are generally perpendicular to the bottom portion, and second means for connecting the sidewalls to the forward and rearward end walls in a manner that the end walls are generally perpendicular to the bottom portion and at a right angle to the side wall associated therewith.

According to this embodiment, the bottom portion has a generally rectangular perimeter and defines a horizontal surface for supporting cargo, and said first means comprises interengaging sockets and stems operating between the lower edges of the sidewalls and the horizontal surface of said bottom portion, said stems being sized to be removably received in said sockets.

Further, each sidewall forms a vertically extending forward and rearward end portion, respectively, adjacent to said forward and rearward cross-rails, and said second means comprises a hinge assembly at each junction formed between the forward and rearward ends of the two opposed sidewalls and associated lateral ends of the forward and rearward end walls. Preferably, each junction is provided with two vertically spaced hinge assemblies. The hinge assembly comprises a pair of connectable hinge elements, one and the other hinge element being on the sidewall and the end wall, respectively, and a hinge pin for interconnecting the hinge elements together.

In a first aspect according to this embodiment, an array of vertical sockets are connected to the bottom portion, and vertically extending beams extend between the top and bottom edges of the side walls and reinforce the side wall, the beams projecting downwardly from the bottom edge and defining a stem which is inserted within a respective of the sockets. A stem and socket pair may be releasably interlocked with one another by means of cross-sections that achieve a frictional engagement, or by the use of a locking pin fitted through the stem and socket.

The means for removably anchoring the mounting frame to the tractor includes an array of anchors and anchor receivers operating between the forward and rearward cross-rails and the tractor. Interengagement between the anchors and anchor receivers anchor and mount the mounting frame to the tractor, wherein the interengagement is releasable such as by means of cross-sections that achieve a frictional engagement, or by the use of a locking pin fitted through the anchor elements.

The container is located relative to the tractor by locator pins and openings operating between the cross-rails and side rails. A pair of locator pins project upwardly from opposite end portions of each of the cross-rails, and a pair of locator openings are disposed, respectively, in the forward and rearward end portions of each side rail. The forward and rearward openings in each respective side rail are associated with and sized to receive a locator pin from each of the forward and rearward cross-rails. Preferably, the locator openings are in the side-rails and the locator pins extend upwardly and away from the cross-rails.

According to this invention, a container system for attachment to a tractor having a receiver trailer hitch and as a temporary replacement for a semi-trailer connected to the hitch comprises
 a mounting frame,
 means for removably anchoring the mounting frame to said tractor,
 a cargo container, and
 means for connecting said cargo container to said mounting frame,
 said cargo container including a forward and a rearward container subassembly, each subassembly including a rectangular bottom portion, a pair of parallel opposed sidewalls, and means for connecting the sidewalls to opposite lateral sides of the bottom portion, said forward container subassembly including a forward end wall, and first means for connecting the forward end wall to the front of the bottom portion thereof.

Further, the rearward container subassembly includes a rearward end wall, and second means for connecting the rearward end wall to the bottom portion thereof.

According to this embodiment, the mounting frame is generally rectangular in shape and includes a pair of side rails and a pair of cross-rails, the end portions of the side rails being connected to the end portions of the cross-rails. The means for connecting the cargo container to the mounting frame comprises each container subassembly including a pair of hollow tubular members, the tubular members extending along the opposite lateral sides of the container subassembly and sized to receive the side rails, the container subassemblies being in abutted relation when mounted onto the side rails.

Further and according to this embodiment, the mounting frame includes means for locating the container subassemblies in abutted relation with one another between the cross-rails, the means for locating including locator pins and locator openings operating between the opposite end portions of the cross-rails and the opposite end portions of the side rails, the locator pins being received within the openings wherein to abut the opposite ends of the connector assemblies and form with the bottom portions a continuous cargo supporting surface.

Further and according to this embodiment, there is included a third container subassembly, including a rectangular bottom portion, first and second side walls, and means for connecting the side walls to opposite lateral sides of the bottom portion, said third container subassembly being interfittable between the forward and rearward container subassemblies.

According to this embodiment, the means for connecting a side wall to the bottom portion of a container subassembly comprises a pair of locking stems extending downwardly and away from the bottom edge of each said side wall and a pair of locking stem receivers located on each lateral side of the bottom portion, the stem receivers oriented vertically and sized to receive a locking stem.

Further, in an aspect hereof, the locking stem is anchored to the stem receiver, such as by a tight frictional interfitting engagement between respective surfaces thereof, or by a locking pin being passed through the locking stem and the stem receiver and operating to hold the locking within the stem receiver.

According to this embodiment, the means for removably anchoring the mounting frame to the tractor comprises an array of anchors and associated anchor receivers operating between the forward and rearward cross-rails and the tractor, and an anchor pin for removably locking an anchor to an anchor receiver. In this regard two pairs of anchors project upwardly from the tractor, at opposite corners of the tractor bed, and two pairs of anchor receivers project downwardly from opposite end portions of the each respective cross-rail, for receipt in a respective pair of anchors.

Further, the means for anchoring also include means for locating the mounting frame relative to the tractor bed. In this regard, a pair of locator pins are upstanding from the opposite end portions of each of the forward and rearward cross-rails and a pair of locator openings are provided in the opposite end portions of each of the side rails, the locator pins of one and the other of the respective cross-rails being received within the locator openings in one and the other end portions of the side rails.

Further and according to this embodiment of the invention, the first means for connecting the forward end wall to the front of the bottom portion thereof comprises a first hinge element provided on a forward end portion of each side wall, a second hinge element provided on the opposite sides of the forward end wall, and a hinge pin received within and interconnecting the first and the second hinge elements.

Preferably, the panels or walls of the container are formed of a durable impact resistant deck-plate steel and provided with an array of strengthening ribs.

In the preferred embodiment, the cross-rails, side rail receivers extending along the opposite sides of the container subassemblies, the anchors and anchor receivers comprise a sleeve formed of square steel tubing.

Further and according to this invention, a method of providing a cargo carrier for use in combination with a vehicle having a hollow trailer hitch receiver, comprises the steps of:
 anchoring a pair of cross-rails atop the tractor,
 forming a container for holding an article, including mounting a forward and a rearward container subassembly onto a pair of side rails, the subassemblies including at least a bottom portion and the bottom portions cooperating to form a horizontal surface for supporting articles thereon, and
 locating the side rails onto the pair of cross rails, the cross-rails and side rails forming a generally rectangular shaped mounting frame.

The step of forming further includes mounting at least one side wall of rectangular shape to the opposite lateral sides of the bottom portion, and for the forward container subassembly, mounting a forward end wall of generally rectangular shape to the forward end of the bottom portion, the end wall and side walls being generally perpendicular to the bottom portion and at right angles to one another.

Depending on the application, a rearward end wall of generally rectangular shape is mounted to the rearward end of the rearward container subassembly, the rearward end wall and side walls of the rearward container subassembly being generally perpendicular to the bottom portion thereof and at right angles to one another.

Additionally, according to this invention, the container system is intended to be provided in kit form and stored conveniently in the belly box of the tractor, which enables the container system to always be available yet stored conveniently when not in use. Such portability provides the user, or truck driver, with hundreds of cubic feet of additional storage space and obviates the need to find and rent costly shuttle vehicles.

Further, the container system according to this invention is fittable with covering structure to protect products being transported, otherwise exposed, from the effects of weather exposure.

Advantageously, the cargo-carrying container and system according to the present invention is simple and easy to use, is economical, and enables the transport industry with the means and a method of readily reconfiguring the tractor with a temporary container and ability to transport cargo into relatively inaccessible locations.

Importantly, the cargo container according to this invention is simple to use, portable, transportable to locations with the regular trailer and then assembled (or torn down) in 20 minutes with a minimum of effort by two unskilled workers, obviates the problems associated with shuttles, utilizes universal brackets that mount on most tractor frames, stores efficiently in the belly box of the tractor, and provides upwardly of 500 cubic feet of loadable space.

The cargo container avoids the high cost and wasted time of renting a shuttle truck, possibly resulting in missed or late deliveries or late pickups because a rental shuttle truck cannot be found.

Further, the cargo container according to this invention enables a protective tarpaulin to be placed in covering relation with an otherwise upwardly open container, thereby providing protection to goods that must be protected from the weather and like elements when being transported in a shuttle fashion.

The above objects and advantages of the present invention will be more clearly understood with reference to the accompanying drawings and to the following Detailed Description, in which like reference numerals refer to like parts and where:

BRIEF DESCRIPTION OF THE DRAWINGS

FIG. 1a is a side elevation view of a conventional transport truck including a tractor and a semi-trailer hitched onto a fifth wheel of the tractor.

FIG. 1b is a side elevation view showing removal of the semi-trailer from the tractor and the fifth wheel.

FIG. 3 is a plan view of the tractor bed and fifth wheel thereof and an array of mounting stems provided thereon for positioning and temporarily anchoring the cargo-carrying container atop the tractor bed.

FIG. 4 is a plan view of the tractor bed and the cargo-carrying container temporarily anchored atop the tractor bed.

FIG. 5 is a plan view of an exploded assembly view showing components of a cargo-carrying container according to this invention positioned for attachment atop the tractor and about the fifth wheel.

DETAILED DESCRIPTION OF THE INVENTION

Figure 2:
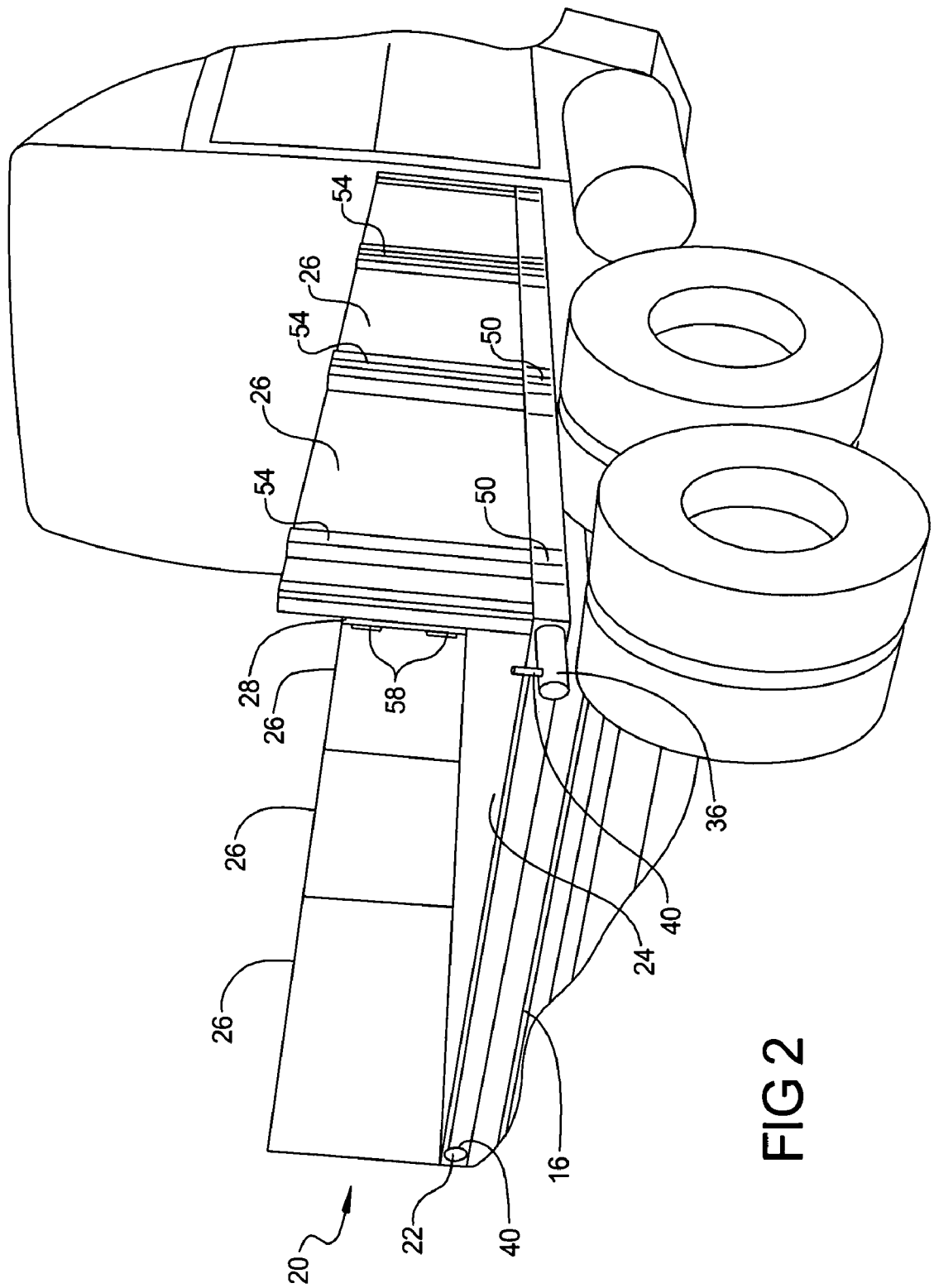
FIG. 2 is a perspective view of the tractor of FIG. 1 converted and temporarily receiving a cargo-carrying container atop the tractor bed according to this invention.

Turning now to the drawings, FIGS. 1a and 1b illustrate a large articulated transport truck 10, known in the art, the truck including a tractor 12 with a semi-trailer 14 connected to a horizontal platform, bed or frame 16 extending over the rear wheels of the tractor. FIG. 1a illustrates the transport truck 10 with the semi-trailer 14 attached to the tractor 12. FIG. 1b illustrates the semi-trailer 14 being removed from its connection to the tractor 12.

The tractor 12 includes the frame or tractor bed 16 and a fifth wheel 18. The fifth wheel 18 is positioned atop the frame 16 and is for connecting the semi-trailer 14 thereto. The structure of the fifth wheel 18 and the method of connection of the semi-trailer 14 thereto is not discussed herein as being understood by those skilled in the trucking art.

As shown in FIG. 1b, when the trailer 14 is removed from its connection with the tractor 12, the rearward bed or platform 16 of the tractor 12 and the fifth wheel 18 are exposed. As noted, a second semi-trailer may be now hitched to the fifth wheel and the removed semi-trailer may be unloaded or otherwise stored. As shown in FIG. 3, the fifth wheel 18 projects upwardly from a generally centered position in the platform.

Referring to FIGS. 2-9, according to this invention, a cargo-carrying container 20 is assembled atop the frame 16 and anchored above the fifth wheel 18. As shown in FIG. 2, the assembled container 20 is upwardly open, comprises a generally rectangular shaped mounting frame 22, a generally rectangular shaped bottom portion 24, a pair of generally rectangular shaped lateral side walls 26, and a generally rectangular shaped forward end wall 28. A generally rectangular shaped rearward end wall 30, which may be removed to permit ease of access for loading and unloading of cargo from the rear of the container, is typically provided (see FIGS. 4 and 5). As will be described in greater detail, the container 20 is assembled, in part, from several container subassemblies 20A, 20B, 20C, etc.

Referring to FIG. 3, the four corners of the tractor frame 16 are provided with an anchor stem 32 for anchoring the mounting frame 22 to the tractor. Each anchor stem 32 projects upwardly from a respective corner of the tractor frame 16 with the fifth wheel 18 centered within the array of stems.

Referring to FIG. 4, the container 20 is shown anchored to the bed 16 of the tractor 12. The rearward end wall 30 is provided.

FIG. 5 shows an exploded perspective view of the container system and assembly according to this invention. The elements shown thereon will be described in greater detail in connection with other of the drawings herein.

Figure 6:
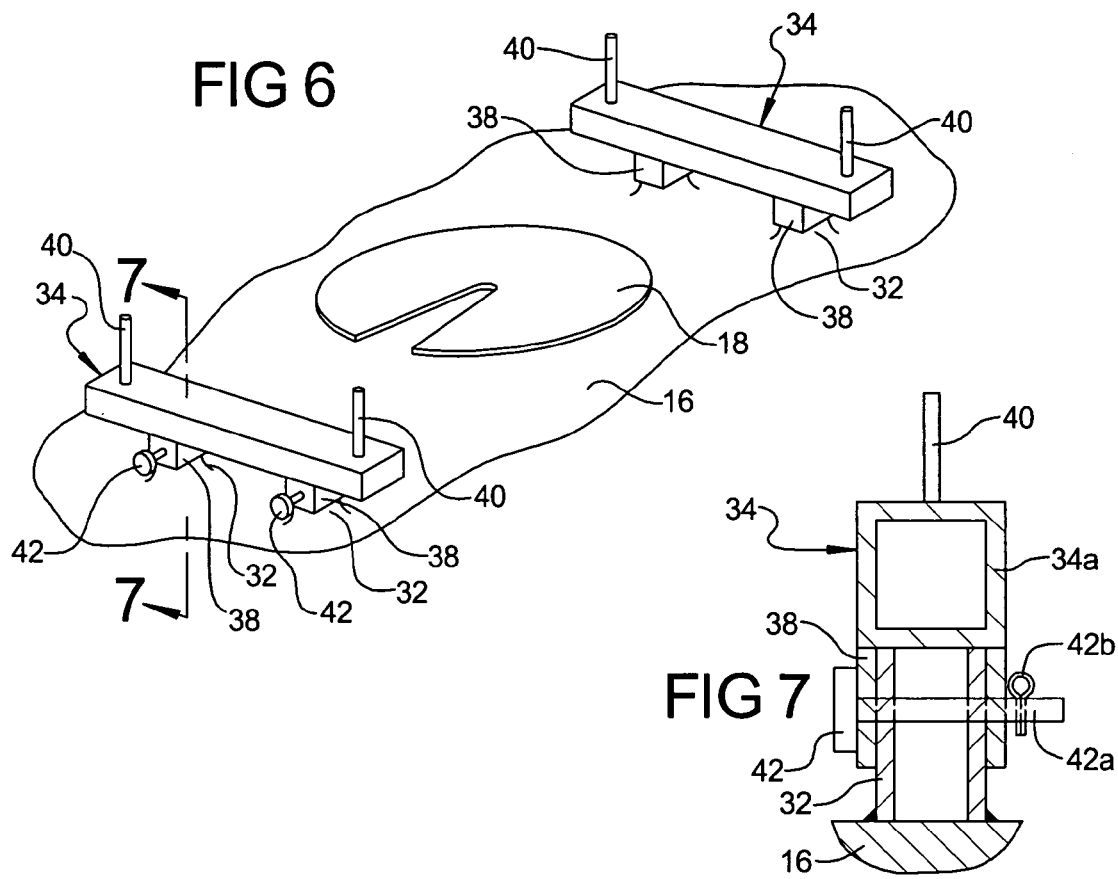
FIG. 6 illustrates a pair of cross-rails mounted atop the tractor and removably anchored to the mounting stems atop the tractor.
Figure 7:
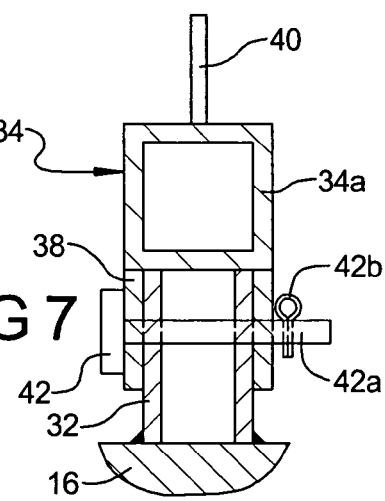
FIG. 7 is a view taken along line 7-7 of FIG. 6 showing the anchored connection between the cross-rail and the anchor stem projecting upwardly from the tractor bed.
Figure 8:
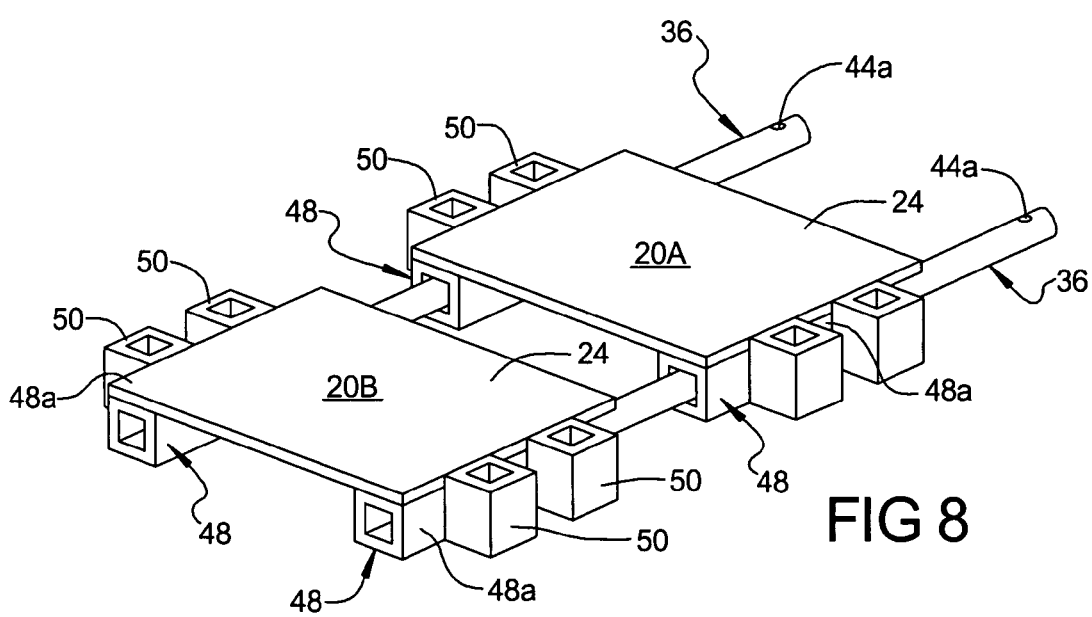
FIG. 8 is a perspective view of a container subassembly, showing two support plates being fitted onto a pair of side rails.

Referring to FIGS. 6-8, the mounting frame 22 includes a pair of cross-rails 34, and a pair of side rails 36. The cross-rails extend transversely of the direction of movement of the tractor and are, respectively, proximate the forward end of the tractor bed 16 and adjacent to the operator cab "C" and proximate to the rearward end of the tractor bed 16. The cross-rail 34 comprises an elongated tube member 34a having a generally rectangular cross-section and includes a pair of anchor receivers 38, each sized to receive an anchor stem 32, and a pair of locator pins 40, adapted to connect and locate a side rail 36. The anchor receivers 38 are generally rectangular in cross-section and sized to receive an anchor stem 32.

Preferably, a fastener 42 removably connects the anchor receiver 38 to an anchor stem 32. As shown in FIG. 7, the anchor receiver 38 is fitted downwardly and about an anchor stem 32, an elongated stem 42a of the fastener 42 is passed through each of the stem 32 and stem receiver 38, and a securement member 42b captivates the end portion of the stem from unwanted withdrawal.

The side rails 36 extend longitudinally along the sides of and between the opposite ends of the tractor frame 16 and comprise an elongated generally hollow cylindrical tube which is provided with a locator opening 44a and 44b, respectively, at the opposite end portions thereof. The locator openings 44a and 44b are directed vertically, sized to be fitted about a locator pin 40, and enable the end portion of the side rail 36 to slide vertically downwardly and onto a cross-rail 34. The locator pins 40 operate to connect the side rails 36 to the cross-rails 34 and locate the container subassemblies in abutted relation on the mounting frame 22 so formed by the side rails 36 and cross-rails 34.

The bottom portion 24 is comprised a planar rectangular deck plate 46 having upper and lower surfaces, a pair of lateral sides and opposite ends, and a pair of hollow tube members 48. The tube members 48 are generally rectangular in cross section, are attached to the bottom surface of the deck plate 46 and each extends along one and the other side of the deck plate and between the opposite ends thereof. The tube member 48 is dimensioned to receive and pass a side rail 36 therethrough.

Mounting structure is provided for removably connecting the sidewalls 26 to the bottom portion 24 in a manner that the sidewalls 26 are generally parallel to one another and perpendicular to the bottom portion 24. According to this invention, interengaging sockets 50 and stems 52 operate between the lower edges of the sidewalls 26 and the outwardly facing sides 48a of the tubes 48 extending between the opposite ends of the bottom portion 24, the stems 52 being sized to be removably received in said sockets.

Preferably, at least one vertical stiffener beam 54, and preferably two, is placed on each sidewall 26, with a portion of the beam extending below the lower edge of the side wall 26 wherein to form a stem 52, and at least one socket 50, and preferably two, is positioned on each side 48a of each tube 48. The stem 52 is adapted to be received within the socket 50, and secure the sidewall in generally perpendicular relation to the plane of the bottom portion 24. Preferably, each sidewall 26 is provided with two beams 54 and associated stems 52, and each side 48a is provided with two sockets 50.

Figure 10A:
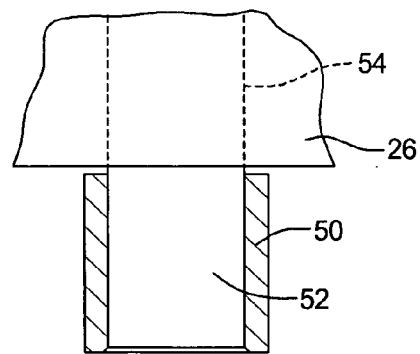
FIGS. 10a and 10b are enlarged sectional views of preferred mounting arrangements between the support plates and the side panels.
Figure 10B:
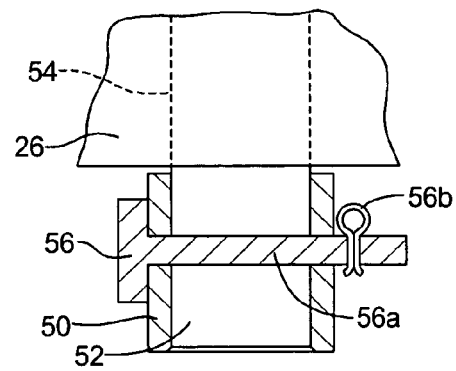

Preferably, the stems 52 and sockets 50 removably secure the sidewalls 26 to the bottom portion 24. In this regard, and referring to FIG. 10a, the cross-section of the stem 52 is slightly greater than the cross-section of the socket 50, wherein to provide a snug frictional engagement. Alternatively, in FIG. 10b, a fastener 56 has a stem 56a thereof passed through the walls forming the socket 50 and the stem 52 to hold each in place and a securement pin 56b prevents unwanted removal of the fastener 56.

Figure 11A:
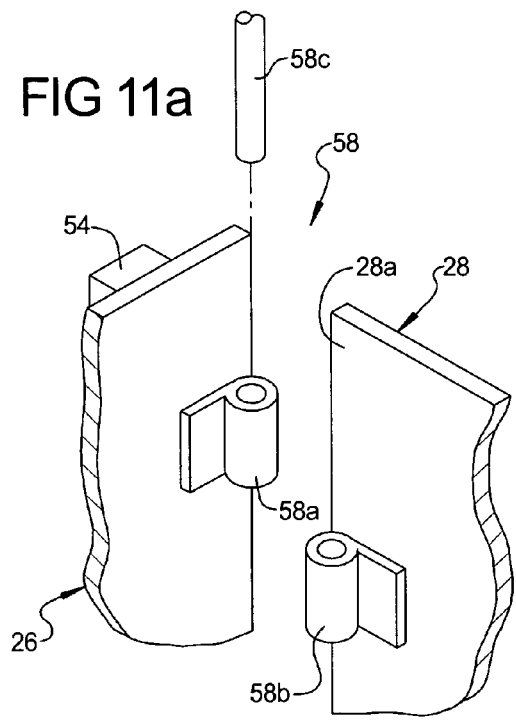
FIGS. 11a and 11b are perspective views, looking downwardly on the container subassembly of FIG. 9, and the mounting and connecting of the forward end panel to the forward side panel.
Figure 11B:
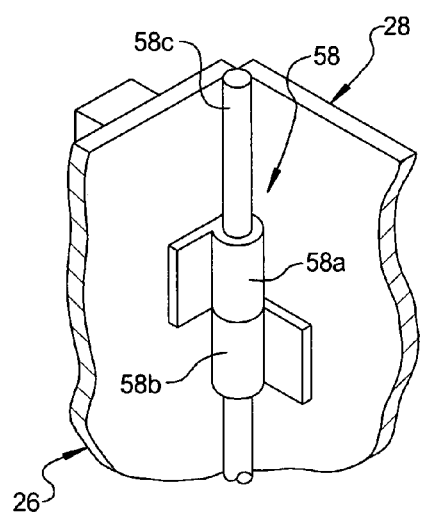

Referring to FIGS. 11a and 11b, mounting structure is also provided for connecting the two parallel and opposed sidewalls 26 to the forward and rearward end walls 28 and 30 in a manner that the end walls 28 and 30 are generally perpendicular to the bottom portion 24 and at a right angle to the side wall 26 associated therewith. In this regard, the sidewalls 26 have vertically extending forward and rearward end portions 26a and 26b, respectively, adjacent to the forward and rearward cross-rails 34, the forward end wall 28 is adjacent to the forward cross-rail and has vertically extending lateral end portions 28a and 28b, and the rearward end wall 30 is adjacent to the rearward cross-rail and has vertically extending lateral end portions 30a and 30b.

At least one hinge assembly 58, and preferably two, operate between the forward end portions 26a of the two opposed side walls 26 when abutted against the respective ends 28a and 28b of the forward wall 28, and also between the rearward end portions 26b of the two opposed sidewalls 26 when abutted against the respective ends 30a and 30b of the rearward end wall 30. The hinge assembly comprises a pair of hinge elements 58a and 58b and a hinge pin 58c for connecting the elements together.

In FIG. 11a, the vertically extending forward end portion 26a of one sidewall 26 is provided with a hinge element 58a, the vertically extending lateral end portion 28a of the forward end wall 28 is provided with a hinge element 58b, and a hinge pin 58c is positioned to connect the hinge elements 58a and 58b together.

In FIG. 11b, the vertical end portions 26a and 28a of the sidewall 26 and forward end wall 28, respectively, are shown abutted, and the hinge elements 58a and 58b connected by the hinge pin 58c. So connected, the sidewall 26 and forward end wall 28 are generally at right angles to one another and perpendicular to the bottom portion 24. The same arrangement would follow for the other lateral side 28b of the forward end wall 28. The same arrangement would follow as well between the sidewalls 26 and the opposite lateral sides 30a and 30b of the rearward end plate 30.

Figure 9:
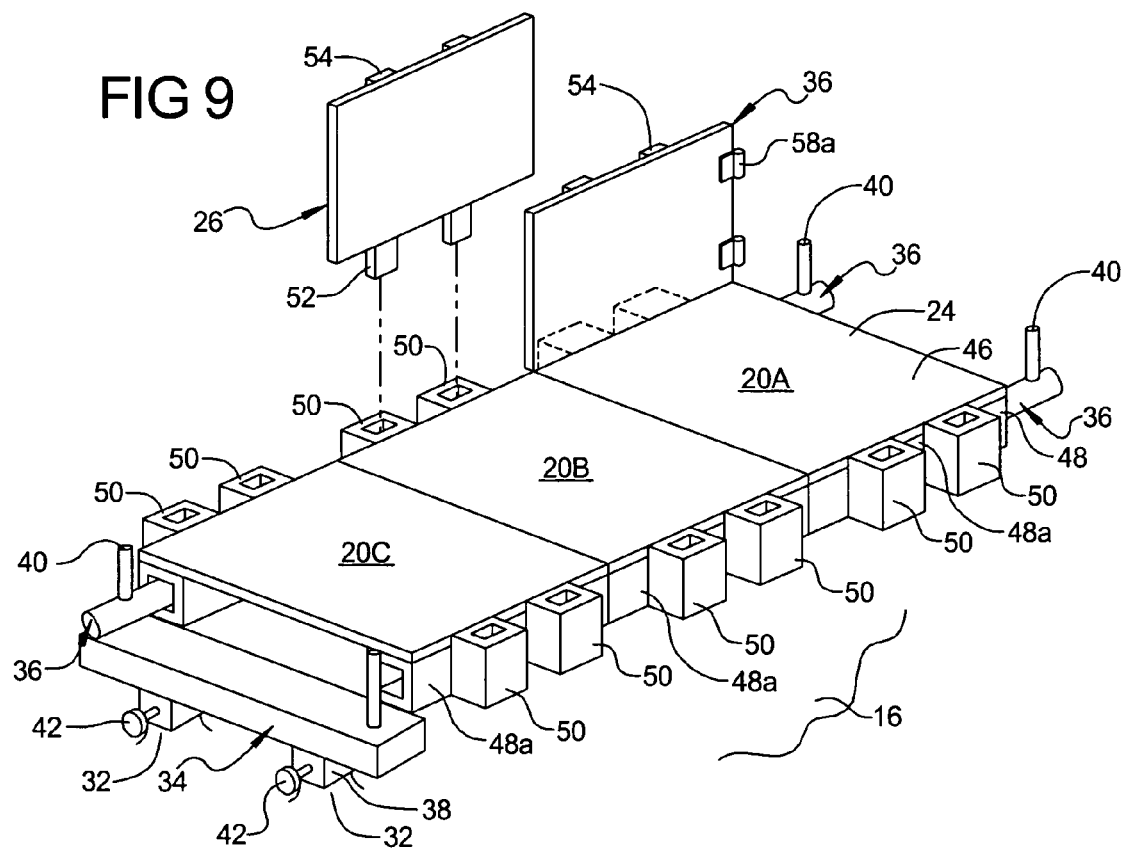
FIG. 9 illustrates the container subassembly and support plates mounted atop the cross-rails and in covering relation above the fifth wheel and the mounting of side panels of the container along the respective edges of the support plates.

As shown in FIGS. 8 and 9, the cargo container 20 may be comprised of two or more container subassemblies, for example, a forward and a rearward container subassembly 20A and 20B and a center container subassembly. Each subassembly comprises a respective bottom portion 24 and respective tube members 48 slidably mounted to the opposed side rails 36, the locator pins assuring that the container subassemblies are in abutted relation when mounted onto the side rails.

Preferably, the sidewalls and the panels of the deck or bottom portion 24 are formed of a durable impact resistant deck-plate steel and provided with an array of strengthening ribs.

In the preferred embodiment, the cross-rails, side rail receivers extending along the opposite sides of the container subassemblies, the anchors and anchor receivers comprise a sleeve formed of square steel tubing.

Further and according to this invention there is provided a method of providing a cargo carrier for use in combination with a tractor or like truck or vehicle having a hollow trailer hitch receiver. The method includes providing the tractor bed or frame 16 of the tractor around the trailer hitch receiver, or fifth wheel 18, with an array or anchors 32. Then, a cargo carrier or container 20 for transporting or holding an article is formed, at least in part. In this regard, a forward and a rearward container subassembly 20A and 20B are mounted onto a pair of side rails 36, wherein each subassembly includes at least a bottom portion 24 and the bottom portions cooperate to form a continuous horizontal surface for supporting articles thereon.

The side rails 36 are located onto a pair of cross rails 34, wherein the cross-rails and side rails form a generally rectangular shaped mounting frame 22.

The mounting frame is anchored atop the tractor, the cross-rails having being interlocked with the array of anchors from the tractor. The cross-rails 34 may be anchored to the frame 16 first, followed by securement of the cross-rails with subassemblies 20A and 20B affixed thereon, or a container 20 formed (including the cross-rails 34, side rails 36, and bottom portions 24) and then anchored as a unit to the anchors 32.

The step of forming further includes mounting a sidewall 26 of rectangular shape to each lateral side of the bottom portion 24, and for the forward container subassembly 20A, mounting a forward end wall 28 of generally rectangular shape to the forward end 46 of the bottom portion, the forward end wall 28 and opposed pair of sidewalls 26 being generally perpendicular to the bottom portion and at right angles to one another.

Depending on the application, a rearward end wall 30 of generally rectangular shape is mounted to the rearward end of the rearward container subassembly, the rearward end wall 30 and sidewalls 26 of the rearward container subassembly being generally perpendicular to the bottom portion thereof and at right angles to one another.

Turning to FIGS. 12-16 there is illustrated another preferred embodiment of a cargo container, indicated generally at 120, according to this invention. As before, the container 120 is assembled to the frame or bed 16 of the tractor 12, projects above and in encircling relation to the fifth wheel 18 thereatop, and is upwardly open. As will be discussed herein below, in some situations the user may need to transport items that need to be protected from the elements. According to this invention, the container 120 is provided with removable cover structure 122 to protect items being transported from the elements.

Figure 16:
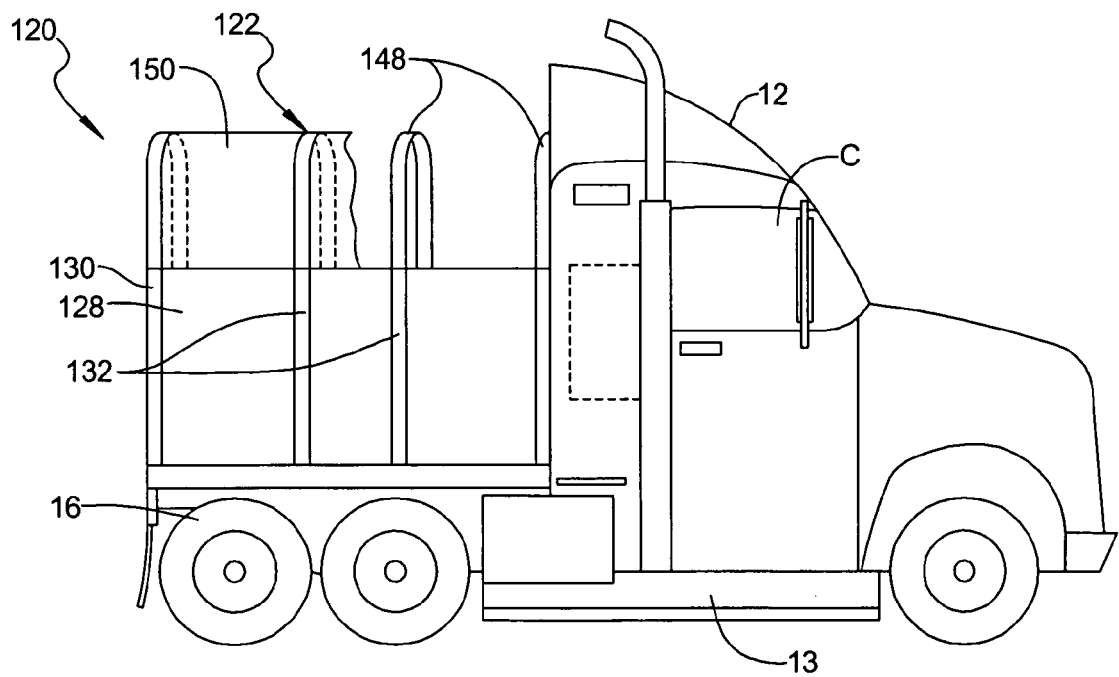
FIG. 16 is a perspective view of a tractor and a belly for transporting the parts of the cargo container showing the cargo container assembled atop the tractor and a tarpaulin structure for covering the interior of the erected container

As shown in FIG. 16 of the drawings, the tractor 12 includes a belly box 13, which enables the container 120 to be supplied to the user in a kit form and be stored conveniently when not in use. Such portability provides the user, or truck driver, with hundreds of cubic feet of additional storage space and obviates the need to find and rent costly shuttle vehicles.

As discussed above, particularly in connection with FIG. 5, the tractor 12 includes four anchor stems 32, disposed about the fifth wheel 18.

The container 120 includes a pair of cross rails 34 and 134 and a pair of side rails 36, which assemble to the tractor frame 16 and form a generally rectangular shaped mounting frame 124, which encircles the fifth wheel 18, a generally rectangular shaped deck 126, which mounts to the frame 124, a series of generally rectangular shaped panels or side walls 128, and a plurality of support posts 130 and 132, which mount the walls to the deck. The cover structure 122 is removably mountable to various support posts 130 and 132.

The cross rail 34 is as discussed above and includes a pair of anchor receivers 38 for fitment with a respective anchor stem 32 and a pair of locator pins 40.

The cross rail 134 is similar to the rail 34 and includes a pair of anchor receivers 38 for fitment within a respective anchor 32. However, each lateral end of the cross rail 134 further includes a receiver sleeve 136, the anchor receivers 38 being as described herein above and the receiver sleeves 136 being perpendicular to the anchor receivers 38 and facing rearwardly of the cab C when the cross rail 134 is mounted to the anchor stems 32.

The side rails 36 are as described herein above and each includes forward and rearward end portions 36a and 36b, respectively, and a locator opening 44a in the forward end portion 36a for receiving a respective locator pin 40 and pinning the side rail 36 to the cross rail 34 and to the tractor 12 adjacent to the cab C. So mounted, each side rail 36 is free to rotate and elevate relative to the locator pin 40.

The deck 126 comprises, in the embodiment shown, three deck sections 126a, 126b, and 126c. The deck sections are similar to one another and each includes a planar generally rectangular shaped deck plate 46, and a pair of hollow tubular members 48. The tube members 48 are generally rectangular in cross section, are attached to the bottom surface of the respective deck plate 46, and extend along the lateral sides of the plate and between opposite forward and rearward ends of the plate. The tube members 48 are dimensioned to receive and pass a side rail 36 therethrough.

Figure 12:
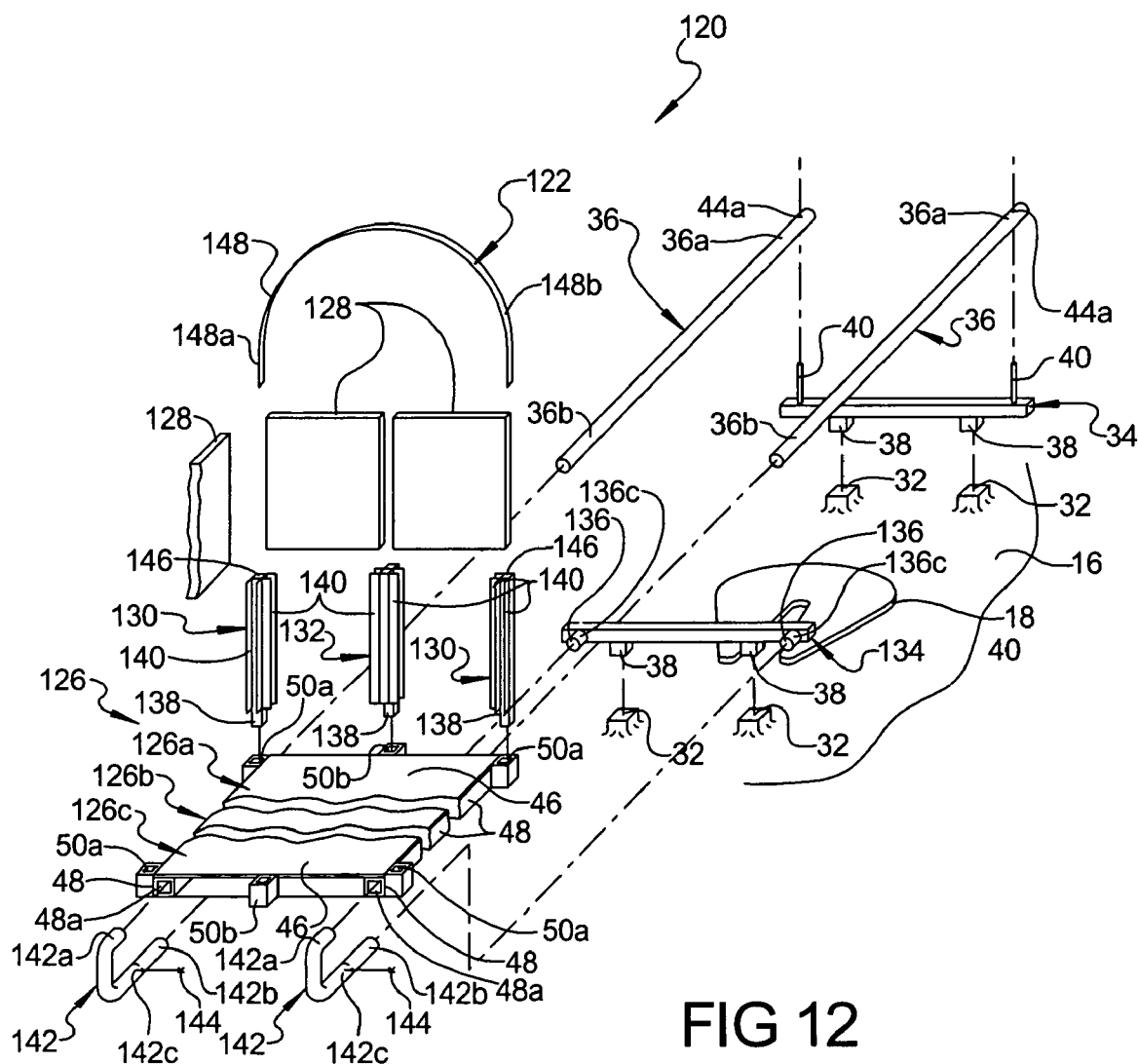
FIG. 12 is an exploded assembly view showing components of a second embodiment of a portable erectable cargo-carrying container according to this invention positioned for attachment atop a tractor and about the fifth wheel.
Figure 13:
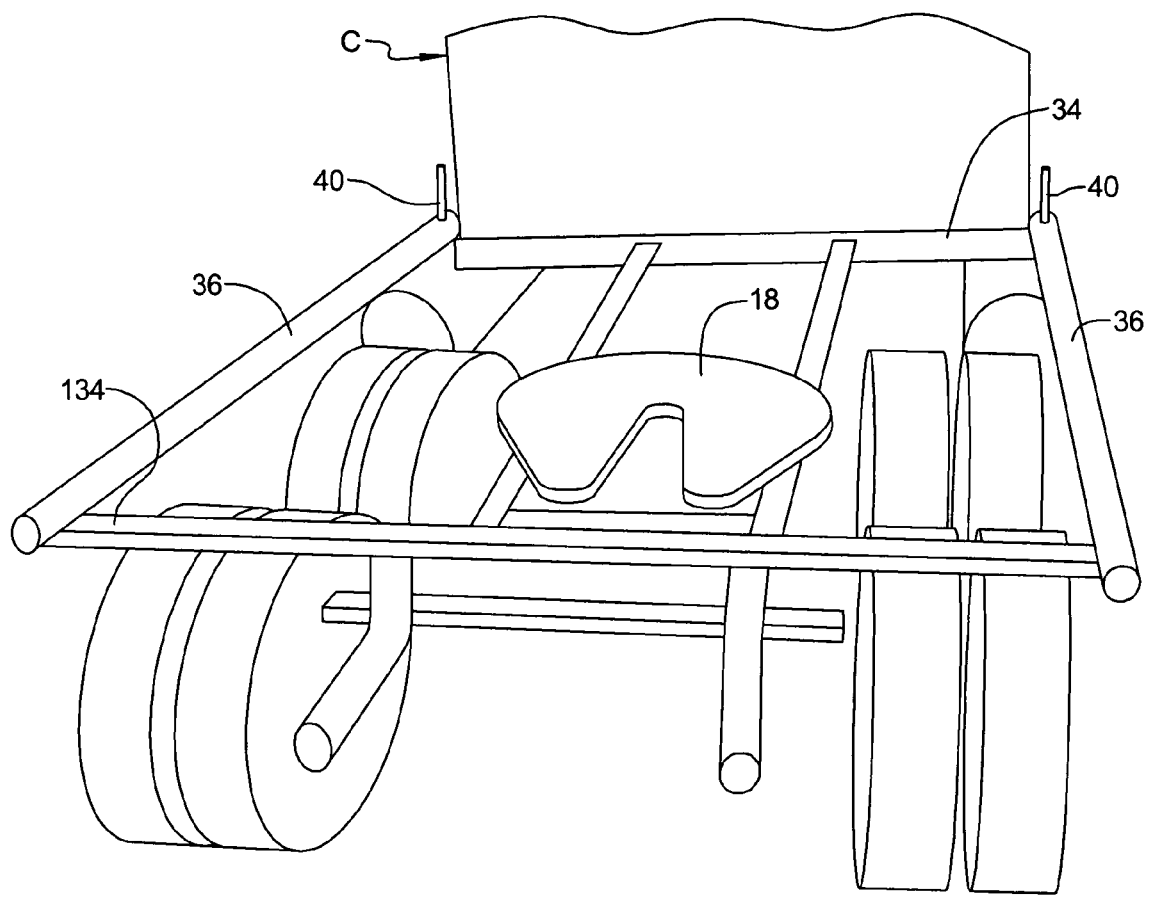
FIG. 13 is a perspective view looking down at a pair of cross rails and a pair of side rails illustrated in FIG. 12 attached atop and in encircling relation about the fifth wheel atop the tractor.
Figure 14:
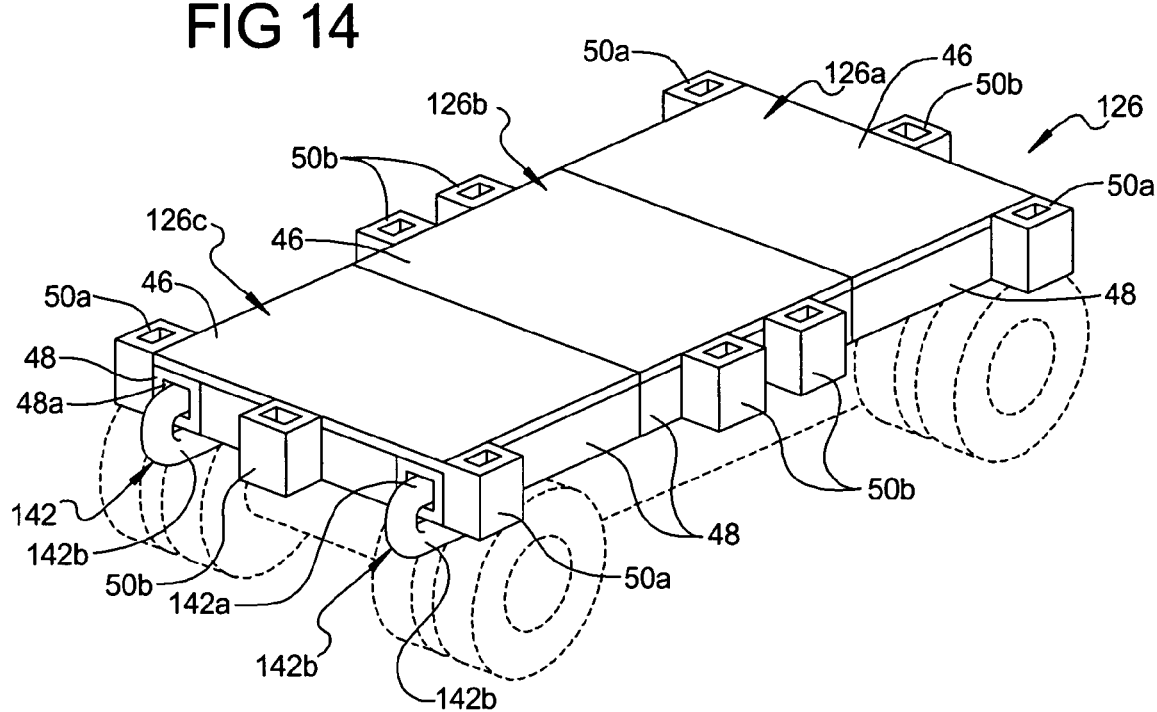
FIG. 14 is a perspective view of three deck plates illustrated in FIG. 12 assembled and secured to the side rails.

As shown best in FIGS. 12 and 14, each deck section 126a, 126b, and 126c includes several sockets 50 for mounting respective of the support posts 130 or 132, the number and location of the sockets depending on the deck section and location thereof relative to the assembled deck 126. The deck section 126a is adjacent to the cab C and includes three sockets 50 along the forward edge of the plate end adjacent to the cab, two sockets 50a being at the edges and one socket 50b being medially of the plate 46 thereof. The deck section 126c is remote to the cab C and includes three sockets 50 along the rearward edge of the plate end remote to the cab, two sockets 50a being at the edges and one socket 50b being medially of the plate 46 thereof. The deck section 126b is medially of the plate sections 126a and 126c and includes two sockets 50b along each lateral side of the plate 46 thereof.

The sockets 50a and 50b have like shape cross sections. As shown, the cross sections are generally square. The sockets are differently identified herein for the purposes of describing a panel supporting post that each socket is to receive.

The support posts 130 and 132 are similar and each includes a central post 138, and a pair of U-shaped channel sections 140. The channel sections 140 are secured to the respective central post 138, open outwardly, and are somewhat shorter in length than that of the support post to which secured wherein to enable the central post of each to extend from the channel sections and be received in a socket 50, and the channels 140 to mount the respective panels 128.

The central post 138 of each support post 130 and 132 is generally square and complementary to the cross section of each socket 50. However, the support post 130 is intended to be used within a socket 50a, at the corner of a deck section 126a and 126c, and the support post 132 is intended to be used within a socket 50b, at the midpoint of a deck section 126a and 126c and along the lateral edges of the deck section 126b. In some applications, to make assembly idiot proof, the center posts 138 and their receiving sockets 50 may be "keyed" to permit only a specific interfitment.

Referring to FIG. 12, the support posts 130 and 132 are positioned above the deck sections 126a, 126b, and 126c and the lower end portions of the center posts 138 positioned to be inserted downwardly into the sockets 50a and 50b. The channel sections 140 of the support posts 130 and 132 are positioned to receive the opposite lateral end portions of a panel 128 inserted downwardly therewithin.

Figure 15:
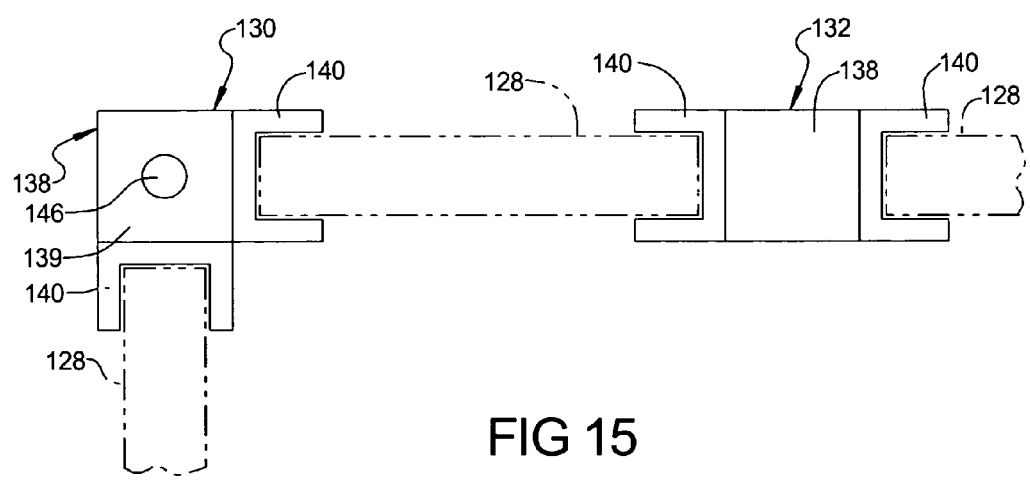
FIG. 15 is a plan view of a pair of support posts illustrated in FIG. 12 for securing panels to the tractor.

Referring to FIG. 15, a corner of the deck section 126a is shown with panels 128 positioned within the channel sections 140 in each of the respective support posts 130 and 132.

Referring to FIGS. 12 and 14, a pair of J-tubes 142 secure the deck sections 126 to the frame 124. The J-tube 142 includes upper and lower portions 142a and 142b, respectively, that are inserted within the openings 48a and 136a, respectively, formed in the tube 48 of the deck section 126c and in the receiver sleeve 136 of the cross rail 134. A cotter pin 144 or the like is passed through alignable openings 142c, and 136c provided in the J-tube 142 and the receiver sleeve 136.

Once assembled, and in use, the user may wish to enclose and cover the upwardly open container 120 thus assembled. Referring to FIGS. 12, 15, and 16, cover structure 122 is provided in the form of a series of semi-circular support beams 148 and a tarpaulin 150.

According to this invention, the central posts 138 of opposed pairs of the support posts 130 and 132 are disposed along the lateral sides of the container 120 and in opposed relation to one another. The top end face 139 of each of these central posts 138 includes a central bore or receptacle 146. The opposite end portions 148a and 148b, respectively, of the support beams 148 are secured into one and the other of a respective pair of receptacles 146 in respective pairs of opposed central posts 138 extending along the side rails 36. The tarpaulin 150 (sees FIG. 16) is then supported and fastened to the series of spaced apart arched support beams 148.

While the principles of the invention have now been made clear in the illustrated embodiments, there will be immediately obvious to those skilled in the art, many modifications of structure, arrangements, proportions, the elements. materials and components used in the practice of the invention and otherwise, which are particularly adapted for specific environments and operation requirements without departing from those principles.

For example, in some applications the box-shaped cargo container 120 could be such that instead of forming the deck 126 from three sections 126a, 126b, and 126c, the deck could be a single section which is slidably mounted to the rails 36, a support post 130 is disposed at each corner of the deck, and a cargo enclosure is formed by four panels, respectively, mounted along the two lateral sides of the deck and across the forward and rearward ends of the deck.

Furthermore, the deck section 126 could be in two sections, if desired.

The appended claims are therefore intended to cover and embrace any such modifications within the limits only of the true spirit and scope of the invention.

What we claim is:

1. A cargo carrier for temporary attachment to the frame of and atop the fifth wheel of a tractor, comprising:
an elongated generally rectangular shaped mounting frame, said mounting frame including a pair of longitudinally extending side rails, a forward cross-rail, and a rearward cross-rail, the cross-rails extending transversely of the side rails;
means for removably anchoring the mounting frame to said tractor such that the rails encircle the fifth wheel; and
an upwardly open container for carrying articles removably secured to said mounting frame and supported thereby.

2. The cargo carrier of claim 1, wherein:
said container includes a bottom portion, a pair of opposed generally parallel sidewalls, a forward end wall, and a rearward end wall opposed to and generally parallel to said forward end wall, said bottom portion and walls being generally planar and rectangular in shape;
first means for removably connecting said sidewalls and said end walls to the bottom portion in a manner that each wall is generally perpendicular to the bottom portion and the walls cooperate to form a generally rectangular box-like enclosure; and
second means for connecting the vertical edges of the sidewalls to vertical edges of the respective forward and rearward end walls in a manner that the end walls are generally at a right angle to the side wall associated therewith.

3. The cargo carrier of claim 2, wherein:
said bottom portion has a generally rectangular perimeter and defines a horizontal surface for supporting cargo; and
said first means comprises interengaging sockets and stems operating between the lower edges of the sidewalls and said end walls and said bottom portion, said stems being sized to be removably received in said sockets.

4. The cargo carrier of claim 3, wherein:
each sidewall, in use, forms a vertically extending forward and rearward end portion, respectively, adjacent to said forward and rearward cross-rails; and
said second means comprises a hinge assembly at each junction formed between the forward and rearward ends of the two opposed sidewalls and associated lateral ends of the forward and rearward end walls.

5. The cargo carrier of claim 3, wherein said second means comprises
a plurality of support posts, each said post including:
an elongated center post having a body portion and a lower end portion configured as said stem; and
a pair of generally U-shaped channel sections, the channel sections being mounted to the body portion of said center post in a manner to open outwardly and receive the vertical end portion of adjacent walls inserted therewithin.

6. The cargo carrier of claim 2, wherein:
an array of vertical sockets are connected to the bottom portion; and
vertically extending beams extend between the top and bottom edges of the side walls and reinforce the side wall, the beams projecting downwardly from the bottom edge and defining a stem which is inserted within a respective one of the sockets.

7. The cargo carrier of claim 1, wherein the means for removably anchoring the mounting frame to the tractor includes an array of anchors and anchor receivers operating between the tractor and the forward and rearward cross-rails.

8. The cargo container of claim 1 wherein:
said forward and rearward cross-rails each have opposite end portions,
a locator pin projects upwardly from each said end portion; and
a locator opening is disposed, respectively, in the forward and rearward end portion of each said side rail, the openings in each respective side rail being associated with and sized to receive a locator pin from a respective end portion of the forward and rearward cross-rails.

9. The cargo container of claim 1, wherein:
a vertical locator pin and locator opening operate between the opposite end portions of the forward cross rail and the forward end portions of the side rails, the locator pin being received in the opening to pin the forward end portions of the side rails and the opposite ends of the forward cross rail to one another;
said container includes a deck plate and a pair of parallel tube elements extending along the opposite lateral sides of the deck plate, said tube elements being configured such that each said tube element receives a respective of said side rails, and further comprising:
connecting means for connecting the rearward end portions of the side rails to the rearward cross-rail, the connecting means including a connecting element having a first portion adapted to fit within a tube element of the cargo container, a second portion adapted to connect to the rearward cross-rail, and a connecting pin for fastening the second portion to the rearward cross-rail.

10. A portable container system for attachment to a tractor having a receiver trailer hitch and as a temporary replacement for a semi-trailer connected to the hitch, comprising:
a mounting frame;
means for removably anchoring the mounting frame to said tractor;
a cargo container, said cargo container comprising:
a first, a second and a third container subassembly, each subassembly including a rectangular bottom portion, and a pair of parallel opposed sidewalls, said first subassembly being at a forward end of said tractor and including an end wall adjacent thereto, and said third subassembly being at the rearward end of said tractor and including an end wall adjacent thereto;
first means for connecting the sidewalls and end walls to the bottom portions in a manner to form an upwardly open box-like enclosure; and
second means for connecting said cargo container to said mounting frame.

11. The container system of claim 10, wherein:
the mounting frame includes a pair of elongated cross rails, mounted atop the tractor and at a forward and rearward location thereof, and a pair of elongated side rails, mounted atop the cross-rails in a manner to form a rectangular frame that encircles the trailer hitch; and
said second means for connecting comprises each said subassembly including a tubular element extending along each lateral side of the bottom portion thereof, the tubular elements on each side of said three subassemblies being alignable with one another and dimensioned to receive and slidably fit about one and the other of said side rails.

12. The container system of claim 11, wherein:
the rearward cross-rail includes opposite end portions and a connector sleeve at each said end portion; and
said second means for connecting further comprises:
pin means for pin connecting the forward end portion of one and the other side rail, respectively, to one and the other end portion of the forward cross-rail;
a pair of connectors for connecting the rearward end portions of the side rails to the connector sleeves at the opposite ends of the rearward cross-rail, the connector including a first portion that is connectable to the tubular element of the subassembly connected to a side rail and a second portion that is connectable to a respective connector sleeve on the rearward cross-rail; and a fastener pin operating to fasten the connector sleeve to the connector.

13. The container system of claim 10, wherein:
said first means for connecting the side walls and the end walls to the bottom portions comprises:
a plurality of sockets disposed around each said bottom portion; and
a corresponding plurality of support posts, corresponding in number to said sockets and including first and second support posts, each said first and second support post including an elongated center post mountable, at least in part, in a socket, and a pair of U-shaped channel sections, the first support posts forming corner posts that are mountable in sockets at the four corners defined by the first and third subassemblies and characterized in that the channel sections are at right angles to one another, the second support posts being mountable in sockets along the edges on the walls, the channel sections being adapted to receive the vertical edges of a wall inserted therebetween.

14. The container system of claim 10, further comprising cover means for covering the upwardly open box-like enclosure, the means for covering including a plurality of arched beams extending transversely between opposite lateral sides of the enclosure and disposed in longitudinally spaced relation between the forward and rearward ands of the enclosure; and
a tarpaulin supported by the support beams.

15. A method of providing a cargo carrier for use in combination with a tractor having a trailer hitch receiver, comprises the steps of:
anchoring a pair of cross-rails atop the tractor;
locating a pair of side rails onto the pair of cross rails, the cross-rails and side rails forming a generally rectangular shaped mounting frame that encircles the hitch receiver; and
forming a container for holding an article, including providing and mounting a container subassembly onto the side rails, the subassembly including a bottom portion in the form of a plate for supporting articles thereon.

16. The method of claim 15, wherein the step of forming a container further includes:
mounting at least one side wall of rectangular shape to each lateral side of the bottom portion such that the side walls are generally parallel to one another and perpendicular to the bottom portion; and
mounting at least one end wall of rectangular shape to the forward end of the bottom portion such that the end wall is generally perpendicular to the bottom portion and the vertical edges of the end wall and adjacent vertical edges of the side walls are connected.

17. The method of claim 16, wherein the step of forming a container further includes:
mounting at least one end wall of rectangular shape to the rearward end of the bottom portion such that said end wall is generally perpendicular to the bottom portion and the vertical edges of said end wall and adjacent vertical edges of the side walls are connected, the end walls being generally in parallel spaced relation and cooperate with the side walls to form a box like enclosure.

18. The method of claim 15, wherein the step of forming a container includes:
providing and mounting a second container subassembly onto the side rails, the subassembly including a bottom portion in the form of a plate for supporting articles thereon, and the mounting following the mounting of the first subassembly onto the side rails, the mounting causing the bottom portions of the two subassemblies to form a generally planar surface for supporting articles; and mounting one or more side walls to the opposite lateral sides of the bottom portions, as combined, and one or more end walls to the opposite forward and rearward ends of the bottom portions, as combined, the mounting connecting the vertical edges of adjacent walls to one another and forming a generally rectangular shaped upwardly open box for containing articles.

19. A portable kit for assembling a temporary cargo container atop the frame of and encircling relation to the fifth wheel of a tractor including brackets for in situ assembling of the cargo container behind the cab of the tractor, comprising:

a forward and a rearward cross rail and a first and a second side rail, each rail being elongated and substantially rigid, said cross rails having a first and second end portion, and said side rails having a forward and rearward end portion;

first means for connecting each said cross rail to the brackets and the forward cross rail proximate to the cab;

second means for connecting the forward end portions of the two side rails, respectively, to one and the other end portion of said forward cross rail;

at least one deck section, the deck section including a deck plate, a pair of tubular members, and a plurality of sockets about the periphery of the deck section, the plate having forward and rearward edges and a pair of lateral edges, one and the other tubular member extending along a respective lateral edge of the plate, and each tubular member being dimensioned to receive and slidably fit about a respective side rail and position the deck section between the cross rails;

a plurality of elongated support posts, each support post including a lower end portion configured for receipt within a respective socket and a pair of outwardly open channel sections;

a plurality of panel sections, each panel section having opposite lateral edges dimensioned for slidable receipt within a pair of adjacent channels when the posts are mounted in the sockets, receipt of said posts in said sockets providing an array of vertical supports for allowing the panel sections to be mounted to and removed from said deck section and form an upwardly open container when so assembled; and third means for connecting the rearward end portions of the two side rails, respectively, to one and the other end portion of said rearward cross rail, the connecting of the cross rails to the side rails retaining the rails to each other and in a substantially fixed relationship.

20. The kit as claimed in claim 19, further comprising:

a plurality of shaped support beams, each support beam having opposite ends;

fourth means for connecting the opposite ends of each respective support beam to a respective of a pair of support posts; and a tarpaulin, said tarpaulin being adapted to be supported by said support beams and sized to cover, as desired, the upwardly open container.

* * * * *